(12) United States Patent
Huetter

(10) Patent No.: US 9,787,562 B2
(45) Date of Patent: Oct. 10, 2017

(54) METHOD FOR MANAGING LOGICAL CONNECTIONS IN A NETWORK OF DISTRIBUTED STATIONS, AS WELL AS A NETWORK STATION

(71) Applicant: THOMSON LICENSING, Issy de Moulineaux (FR)

(72) Inventor: Ingo Huetter, Pattensen (DE)

(73) Assignee: THOMSON Licensing, Issy-les-Moulineaux (FR)

(*) Notice: Subject to any disclaimer, the term of this patent is extended or adjusted under 35 U.S.C. 154(b) by 23 days.

(21) Appl. No.: 14/139,285

(22) Filed: Dec. 23, 2013

(65) Prior Publication Data
US 2014/0189106 A1 Jul. 3, 2014

Related U.S. Application Data

(63) Continuation of application No. 10/531,775, filed as application No. PCT/EP03/11832 on Oct. 24, 2003, now abandoned.

(30) Foreign Application Priority Data

Oct. 28, 2002 (EP) .................................... 10250102

(51) Int. Cl.
*G06F 15/173* (2006.01)
*H04L 12/26* (2006.01)
(Continued)

(52) U.S. Cl.
CPC ...... *H04L 43/0811* (2013.01); *H04L 12/2805* (2013.01); *H04L 12/2838* (2013.01);
(Continued)

(58) Field of Classification Search
CPC ............. H04L 43/0811; H04L 12/2805; H04L 12/2838
See application file for complete search history.

(56) References Cited

U.S. PATENT DOCUMENTS 5,825,752 A 10/1998 Fujimori et al.
6,603,744 B2 8/2003 Mitsutani et al.
(Continued)

FOREIGN PATENT DOCUMENTS

| JP | 62-159245 | 7/1987 |
|---|---|---|
| JP | 09-083550 | 3/1997 |
| JP | 11-112524 | 4/1999 |

OTHER PUBLICATIONS

J.Ritchie et al: "UPnP AV Architecture: 0.83", Microsoft Corporation, Jun. 12, 2002, pp. 1-22.*
(Continued)

*Primary Examiner* — Derrick Ferris
*Assistant Examiner* — Farhad Ali
(74) *Attorney, Agent, or Firm* — Brian J. Dorini; Robert D. Shedd

(57) ABSTRACT

The invention relates to the technical field of domestic networks. A domestic network based on the present UPnp-Standard allows AV connections to be set up between two network subscriber stations—Network connections such as these are set up and managed under the control of a network station which is in the form of a control point. In this case, the UPnP-Standard allows the network station which is the form of a control point to log off the network after setting up an AV connection, and thus to be inactive while the AV connection that has been set up is in existence. This results in the problem that an AV connection which has been set up unnecessarily remains in existence even after the desired AV data stream has been transmitted, so that further connection requests for such stations must be answered with a rejection. The invention solves this problem in that it provides additional monitoring means in the network subscriber stations which determine whether the connection has remained unused for a specific time. If yes, a signaling request is sent to all the network subscriber stations. If the connection (Continued)

partner station does not then respond, the connection which has been set up can likewise be added autonomously by the requesting station.

20 Claims, 6 Drawing Sheets

(51) Int. Cl.
   *H04L 12/28* (2006.01)
   *H04L 29/06* (2006.01)
(52) U.S. Cl.
   CPC .............. *H04L 29/06* (2013.01); *H04L 69/28* (2013.01); *H04L 2012/2843* (2013.01); *H04L 2012/2849* (2013.01)

(56) References Cited

U.S. PATENT DOCUMENTS

| | | |
|---|---|---|
| 7,085,814 B1 | 8/2006 | Gandhi et al. |
| 7,191,239 B2 | 3/2007 | Rozenfeld et al. |
| 2002/0029269 A1 | 3/2002 | McCarty et al. |
| 2002/0083143 A1 | 6/2002 | Cheng et al. |
| 2003/0005130 A1* | 1/2003 | Cheng ........................ 709/228 |
| 2004/0205219 A1* | 10/2004 | Li ................ H04L 29/06027 709/231 |

OTHER PUBLICATIONS

Ritchie, John. "UPnP AV architecture: 0.83" (Jun. 12, 2002), pp. 1-22.*
HAVi—the AV digital network revolution, HAVi Organisation, San Ramon, 1999.
McDowell et al., "Connecting non-JAV adevices to a Jini network", Technology of Object-Orientated Languages, 2000.
UPnP AV Architecture:1, For UPnP Version 1.0, Status: Approved Designed Document, Jun. 25, 2002, Copyright 2002, 22 pages.
International Search Report for PCT/EP03/11832, mailed Nov. 3, 2004, 2 pages.

* cited by examiner

METHOD FOR MANAGING LOGICAL CONNECTIONS IN A NETWORK OF DISTRIBUTED STATIONS, AS WELL AS A NETWORK STATION

This application is a continuation of co-pending U.S. application Ser. No. 10/531,775, filed Apr. 19, 2005, herein incorporated by reference, which claims the benefit, under 35 U.S.C. §365 of International Application PCT/EP03/11832, which was published in accordance with PCT Article 21(2) on May 6, 2004 in English and which claims the benefit of German patent application No. 10250102.5, filed Oct. 28, 2002.

The invention relates to the technical field of domestic networks.

BACKGROUND OF THE INVENTION

The efforts to network evermore electronic devices to one another domestically or at home have already now progressed to a very major extent. A range of different standards for the networking of devices have now been worked out, some of which have different objectives. One of the systems envisages devices being networked on the basis of the so-called Internal Protocol IP. A first version of a Standard is already available for this system. This system has become known by the abbreviation UPnP, which stands for Universal Plug and Play. The corresponding standard is currently available, in Version 1.0. Further information related to the UPnP System and the associated Standard can be found on the official Internet site for the UPnP consortium at www.upnp.org. In the UPnP System, there are no restrictions on the device types. It is thus intended to be possible to network not only devices from the consumer electronics field such as TVs, DVD players, set-top boxes, video recorders, camcorders etc., but also domestic devices, such as washing machines, refrigerators, heating controllers, automatic coffee machines, and so on. Personal computers may form a specific category of devices, although these are also taken into account in the UPnP System and can also be integrated in the network.

However, the various layers of the OSI/ISO reference model for data communication are not specified in the UPnP system. This relates in particular to the bit transmission layer and the data link layer. The UPnP System therefore no longer contains any specification related to the transmission medium via which the data to be interchanged must be transmitted. Widely differing transmission standards are permissible here. These include, for example, the Ethernet Protocol, IEEE 1394 Protocol, wire-free transmission itself in accordance with IEEE 802.11x, Bluetooth or HIPERLAN/2.

INVENTION

In the course of UPnP Standardization, a specification for the transmission of AV data (audio/video-data) between network subscriber stations has also been worked out, and was completed in June 2002. The precise title of this specification is: UPnP AV Architecture: 0.83 dated Jun. 12, 2002. This specification defines three different types of devices for the transmission of AV data. Firstly a so-called media server, which is always allocated to that device which is chosen as the source of the AV data. The second device type is the media renderer, which is allocated to a device which is chosen as a data sink for the AV data. Thirdly, a control point type is also provided, as a dedicated type of device. A universal remote control for AV devices is generally considered to be an example of a control point device. However, alternatively, a personal computer in the network can also carry out this task, or else a TV with a remote control may likewise be suitable as a control point. The control point device communicates with two further UPnP devices, which may be used as a data source and data sink for a desired AV connection. The control point device initializes and configures both devices for the AV connection, so that the desired data stream can also be sent. Once an AV connection such as this has been set up, the control point device does not need to control the rest of the data transmission, and the UpnP AV specification does not contain any stipulations that the control point must be active all the time throughout the duration of the AV connection that has been set up. Instead of this, the control point device may also be disconnected from the network. The task of a control point device is thus typically to set up an AV connection between two network subscribers, to make any changes required to the settings of the two devices (typically including the volume setting, the brightness setting, the contrast setting, the tone setting, the sharpness setting and so on) and, once the desired AV data stream has been transmitted, to cap the connection once again, that is to say request both devices associated with the AV connection to delete the data that characterizes that connection.

If, however, as has already been mentioned above, the control point device is disconnected from the network once the AV connection has been set up, irrespective of whether this is a result of disconnection by the user or a result, of a malfunction, then it is possible for the situation to occur in which the two devices in the AV connection still remain connected to one another even after the AV data stream has been transmitted, and in the worst case even for as long as the devices remain switched on. This behavior conceals the risk that, if the control point device once again wishes to set up an AV connection for one of the previously connected devices at a later point in time, this new connection cannot be set up because one of the previously connected devices is still maintaining the old AV connection. The control point device could admittedly deal with this fault situation if it were previously to gather all the data about the connections that have been set up by all the network subscriber stations, but this would involve a high degree of complexity in terms of additional messages, which would be incurred whenever the control point device had previously been switched to be inactive.

The invention solves the problem in that a portion of the control point device functionality is implemented in media server and media renderer devices for an AV connection.

In a method for managing logical connections which have been set up in a network of distributed stations, provision is made for one station to monitor the connection which has been set up, to determine whether the station which is logically connected to it has sent a logging-off message and, if yes, for this station to autonomously internally end the setting up of the logical connection to the station that has logged of. Specifically, whenever a station in the UPnP System is switched off, it transmits the so-called ssdp: byebye message to all the other stations. If the station which is connected to the station that has logged off detects this logging-off message, then it is automatically clear that the connection can be ended. This is then carried out autonomously internally by the partner station.

However, a situation is possible in which a station is no longer able to send the logging-off message. For example, if the network plug for this station is pulled out, it is no longer possible to transmit this logging-message. In this situation, it is advantageous for provision to be made for a station to monitor an AV connection to determine whether the logical connection has remained unused for a first specific time and if yes, to send a signaling request to the station in the network and, finally, to monitor all the signals from the network stations and, in the absence of signaling from the station to which it is logically connected, to automatically internally end the setting up of the logical connection. In consequence, a connection is thus correctly cleared even when a station which is logged off from the network is no longer able to send the logging-off message.

This measure can advantageously also be carried out in particular whenever a new connection request arrives at the station.

It is also advantageous if it is found after a signaling request that the other station in the logical connection that has been set up is still in the network but that the logical connection has remained unused for a second specific time, for the station which is carrying out the check to internally finally end the setting up of the existing logical connection, which has been inactive beyond the specific time limit (which may be several hours).

Corresponding advantageous measures for a network station are listed in claims 7-11.

DRAWINGS

Exemplary embodiments of the invention will be explained in more detail in the following description and are illustrated in the drawings, in which.

EXEMPLARY EMBODIMENTS OF THE INVENTION

Figure 1:
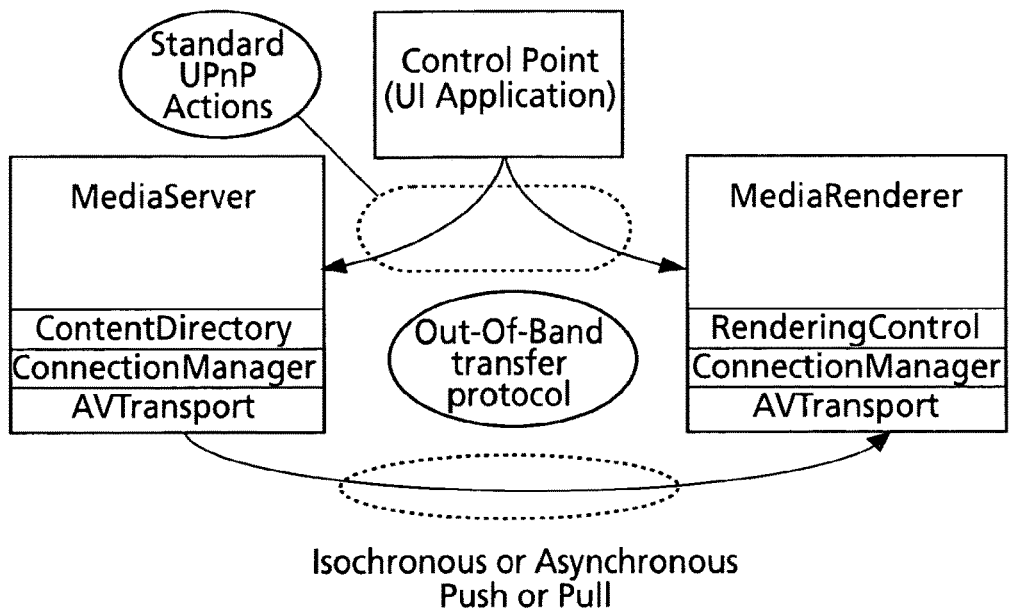
FIG. 1 shows an outline diagram of the transmission of AV data between two network stations using the UpnP AV Architecture: 0.83.
Figure 3:
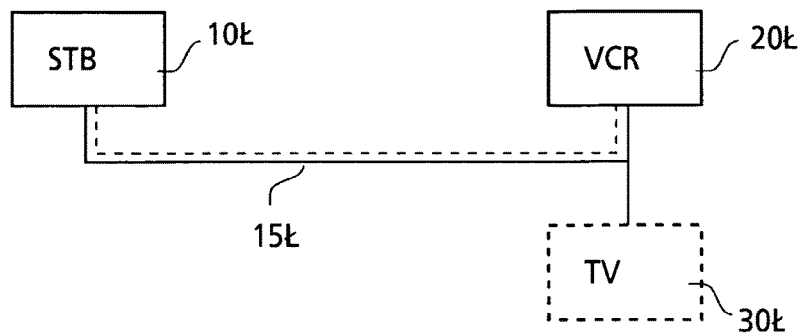
FIG. 3 shows an example of the network shown in FIG. 2 with an AV connection having been set up.

AV connections between two devices in a domestic network are set up in accordance with the AV specification for the UPnP Standard cited above. The UPnP AV specification in this case distinguishes between three different station types. Firstly a so-called media server. That station in an AV connection which is intended to be used as the data source is associated with the media server device type in accordance with the UPnP AV specification. The second type of device is a media renderer. This type is assigned to the device which has been chosen as the data sink for the AV connection. Another type of device is the control point. This device type is normally assigned to the device type on which the control values are displayed. This is thus normally a device which is equipped with a display. The TV in a domestic network is mentioned as one example. Other examples are a personal computer which is integrated in the domestic network, or a universal remote control with a display, which is likewise integrated in the domestic network by means of wire-free transmission. FIG. 1 shows the fundamental subdivision of network stations which are required for an AV connection. The media server device includes or has access to an AV data stream which, for example, in stored locally or is received externally. The media server device has access to the AV data and is able to transmit an associated AV data stream via the network to another network station. The AV data stream is in this case transmitted using a transfer protocol appropriate for the transmission medium used in the network. The associated data format is defined in the transfer protocol, and the media server must have this transfer protocol implemented in it. In FIG. 3, the transport protocol is referred to in a general form as an AV protocol. The media server device type can typically be allocated to one of the following devices. VCR, CD/DVD player, camera, camcorder, PC, set-top box, satellite receiver, audiotape-player etc. A module for a so-called content directory is normally implemented in the media server in accordance with the UPnP Standard for selection of a specific AV content. In addition, there is also another module, which is referred to as a connection manager. This module is required for communication with the control point device.

A media renderer device receives the AV data stream that is transmitted from the media server and emits this either as picture information or as audio information. The media renderer device thus likewise contains an implementation of the AV transport protocol. In the same way, the media renderer device likewise contains an implementation of the connection manager module for communication with the control point device. Furthermore, a rendering control module is implemented in the media renderer device. This module is used, for example, to implement the command received via the connection manager to adjust replay characteristics, such as the volume, tone, picture sharpness, contrast, brightness, color and so on. A TV, a stereo amplifier and an MP3 player may be mentioned as example of devices to which the media renderer device type should be assigned in the domestic network.

A control point device coordinates the data transport between the media server and the media renderer. It is likewise used to implement the control commands from the operator and to pass them to the corresponding appliances in the AV connection. This relates in particular, as an example, to the play, stop, pause, fast forward and fast reverse commands. As mentioned, the control point device is likewise used to produce the user interface for the operator. The control point device is active in particular when setting up the logical connection between two network stations. It is likewise also used when the aim is to end the setting up of the AV connection after an AV connection has served its purpose, that is to say that the AV data stream has been transmitted as selected. However, UPnP AV specification does not stipulate as an essential feature that the control point device must remain active throughout the entire duration of the AV connection. The problems that are associated with this have already been explained in the introductory part of the application.

As is shown in FIG. 1, the transmission of the AV data in accordance with the implemented AV transport protocol is independent of a communication with the control point device. The data stream is thus transmitted even when the control point device has logged off the network after setting up the AV connection. Since the known transport protocols are standardized, no further information relating to them will be given in the following text. In contrast, a more detailed explanation will be given of the additional means which must be provided for the connection manager in order to implement the invention.

Figure 2:
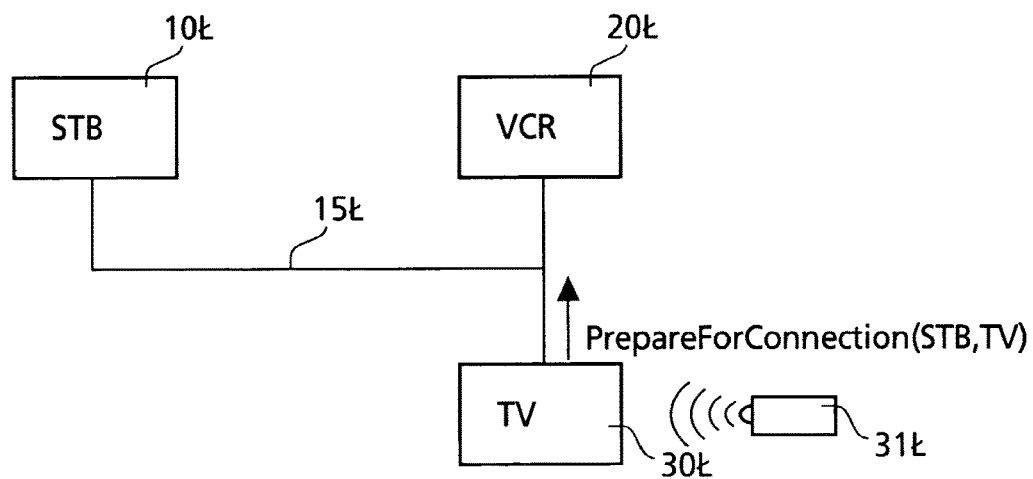
FIG. 2 shows the procedure for an AV data transmission between a set-top box and a video recorder.

FIG. 2 shows a simple domestic network. The reference number 10 denotes a set-top box for receiving digital television and radio programs. The reference number 20 denotes a video recorder. The reference number 30 denotes a TV. A remote control 31 is also illustrated separately. Nowadays, so-called universal remote controls are typically supplied, with which further devices can then also be controlled. It is therefore assumed here that the same remote control can also be used for remote control of the set-top box and video recorder 20. The reference number 15 denotes the bus connection for networking of the devices. A bus connection based on the Ethernet Bus Standard is mentioned here by way of example. However, the invention is applicable irrespective of what bus connection is actually used. Other bus connection standards include, for example, IEEE 1394, IBM Token Ring, Powerline, and wire-free transmission standards such as IEEE 802.11b and HIPERLAN/2.

In the situation illustrated in FIG. 2, the operator has used a remote control 31 to set up an AV connection between the set-top box 10 and the video recorder 20. The TV 30 then acts as the control point device to send the prepare-for connection instruction (STB, VCR) as specified in the UPnP Standard. This instruction is used to address the connection manager module for the set-top box 10 and for the VCR 20. The instruction is unambiguous with respect to the question as to which device should be used as media server device and which as the media renderer device. In this case, the set-top box 10 should be used as the media server, and the video recorder 20 as the media renderer.

FIG. 3 shows an example of the network after setting up the AV connection between the set-top box 10 and the video recorder 20. In this case, the TV 30 is now shown only by dashed lines. This is intended to indicate that the TV has logged off the network after the connection has been set up. For example, the AV connection can be set up on the basis of the video recorder 20 having been previously programmed to record a specific TV program. Once the connection has been set up and the video recorder has been programmed, the user then switches off the TV because it is not in fact required to record the selected program. The AV connection that was set up is represented by dashed lines in FIG. 3.

Figure 4:
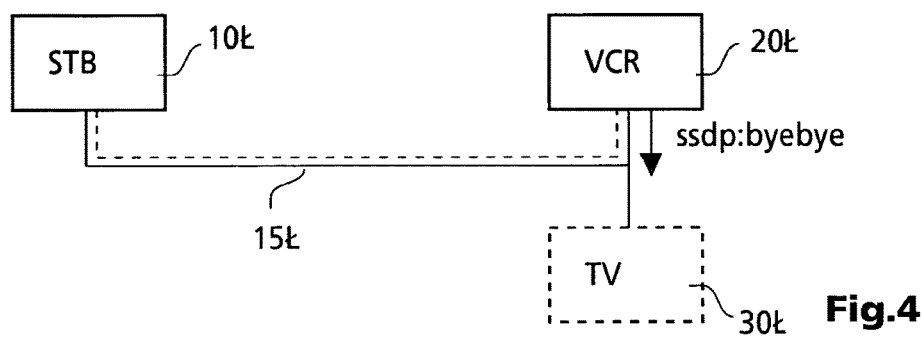
FIG. 4 shows the transmission of a logging-off message after a station in the connection that has been set up is switched off.

FIG. 4 shows the network example at the time after which the video recorder has recorded the programmed TV program. The video recorder 20 normally switches itself off after recording the programmed time. This time is illustrated in FIG. 4. Since this is a normal switching-off process, the video recorder 20 would in this case also generate a logging-off message ssdp:byebye provided in the UPnP Standard, and will send this using the so-called multicast addressing mode to all the network stations. At the time that the logging-off message is sent, the TV 30 is, however, inactive (in the standby mode or power-off mode). It therefore cannot evaluate the logging-off message from the video recorder 20 when it is in the power-off mode, nor, depending on the design, can it evaluate it when in the standby mode. Instead of this, the set-top box evaluates the logging-off message from the video recorder 20. This is a special feature of the invention since the UPnP Standard does not does not provide for a media server device or a media renderer device other than the control point device to have to evaluate this logging-off message. If the set-top box 10 has identified the logging-off message, it will also, according to the invention, end the setting up of the AV connection between the set-top box 10 and the video recorder 20. In the simplest case, this can be done by carrying out the connection complete (STB, VCR) action provided in the connection manager in accordance with the UPnP Standard. This action is supported in the connection manager module of both the media server device and of the media renderer device.

Figure 5:
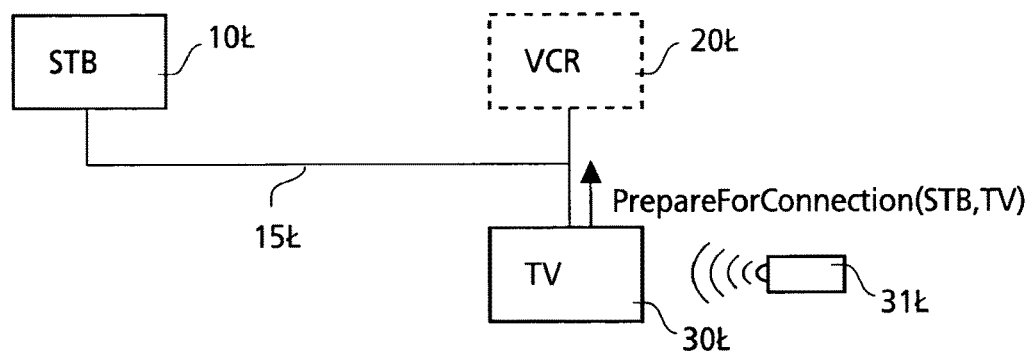
FIG. 5 shows the procedure for connecting a device between a set-top box and a TV.

FIG. 5 now shows the network after clearing the AV connection between the set-top box and the video recorder 20. The video recorder 20 is shown by dashed lines in FIG. 5 in order to indicate that this device has logged off the network. At the same time, the TV 30 has been activated again, and the operator has requested that an AV connection be set up between the set-top box 10 and the TV 30, using the remote control 31. The TV 30 then sends the associated prepare-for connection (STB, TV) instruction. The set-top box 10 and the TV 30 will carry out this instruction, since the set-top box 10 had evaluated the logging-off message ssdp:byebye as already shown in FIG. 4, and had once again deleted the AV connection that had previously been set up.

Figure 6:
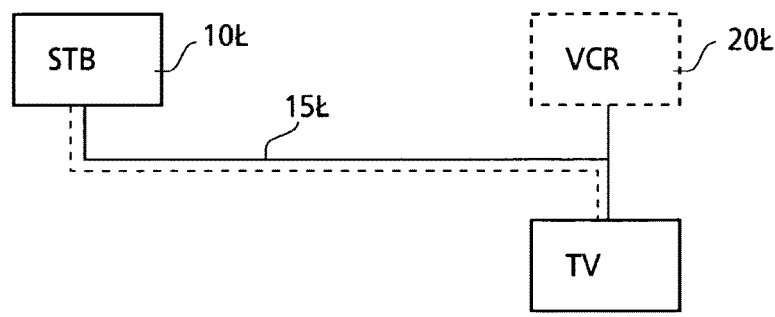
FIG. 6 shows the AV connection which is set up between a set-top box and a TV.
Figure 7:
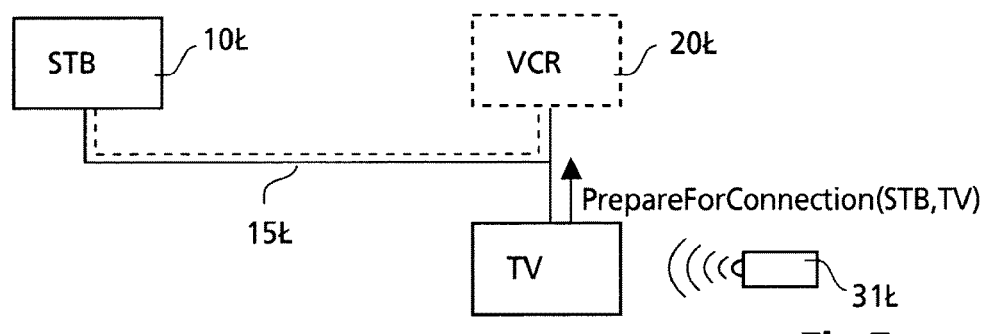
FIG. 7 shows the remaining existence of a connection which has been set up, after a station in the AV connection has been switched off.

FIG. 6 shows the network after setting up the AV connection between the set-top-box 10 and the TV 30. There are problems in setting up a new AV connection when the old existing AV connection for a network subscriber station which is also selected for the new AV connection is still entered in the memory. This is because the station which was requested to set up a further AV connection will then have to reject this request, since there are normally only sufficient resources for one AV connection. This situation is illustrated in FIG. 7. In this case, the video recorder 20 has disconnected itself from the network without sending the logging-off message ssdp:byebye. The AV connection that is set up is thus still entered in the memory for the set-top box 10. If the prepare-for connection (STB, TV) instruction is now sent by the TV 30, the set-top box 10 must reject this request since, in fact, an AV connection already exists. In order to circumvent this undesirable situation in a domestic network, the invention also provides further features, which will be explained in the following text.

Figure 8:
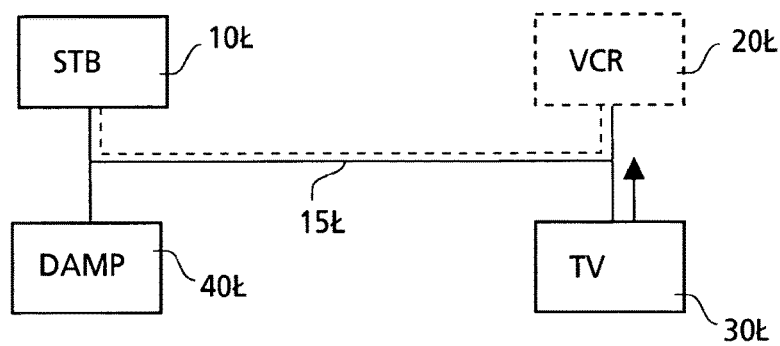
FIG. 8 shows the problem of setting up an AV connection between a set-top box and a stereo amplifier when a connection is still in existence between the set-top box and the video recorder.

To this end, FIG. 8 shows a further example of a domestic network. In this situation, a stereo amplifier 40 is provided in addition to the set-top box 10, video recorder 20 and TV 30 stations. This stereo amplifier is a digital amplifier which can receive digital audio signals as input signals, can convert them to analogue data, and can output them in amplified form to the loudspeaker. FIG. 8 shows the situation where an AV connection had previously be set up between the set-top box 10 and the video recorder 20. The video recorder is once again illustrated by dashed lines as an indication that it has logged off the network. However, the logging-off process was not carried out correctly using the logging-off message. By way of example, the user could have integrated the stereo amplifier in the network for the first time and in the process could have removed the network connector from the video recorder, and could have subsequently forgotten to plug it in again. The situation which then results is illustrated in FIG. 8. As before, the AV connection from the set-top box 10 to the video recorder is still entered in the memory.

Figure 9:
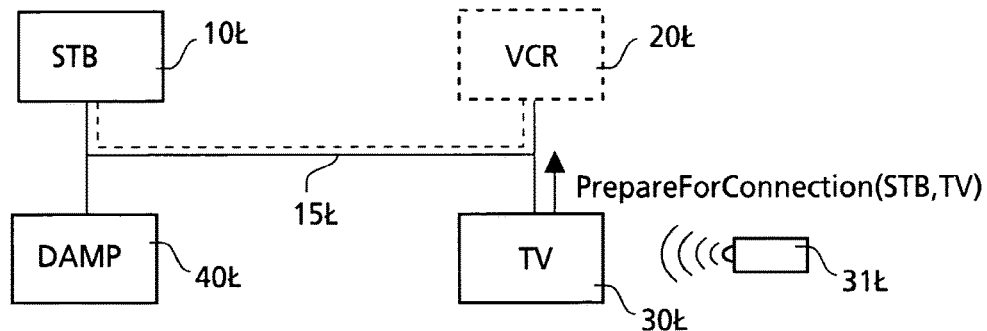
FIG. 9 shows the procedure for setting up an AV connection between a set-top box and a stereo amplifier.
Figure 10:
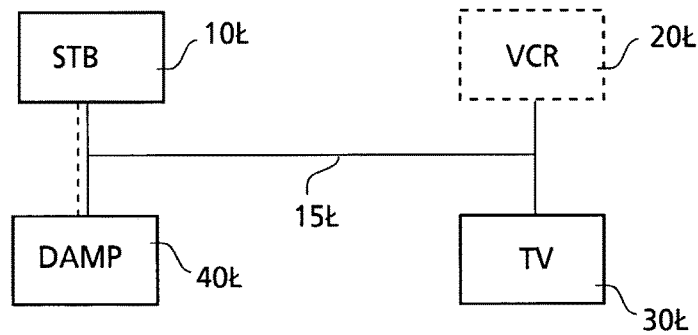
FIG. 10 shows the AV connection which is set up between a set-top box and a stereo amplifier.

Referring to FIG. 9, the user has entered the request to set up a connection between the set-top box 10 and the stereo amplifier 40. Once again acting as the control point device, the TV 30 then sends the UPnP instruction prepare-for connection (STB, DAMP). According to the invention, the set-top box 10 will then check whether the existing connection for the video recorder 20 is still valid. The way in which this is done will be explained in more detail later in conjunction with FIGS. 11 and 12. In the situation illustrated in FIG. 9, the AV connection which has been set up is no longer active, and can therefore be deleted. The deletion of the setting up of the connection is initiated by the set-top box 10, specifically by the connection manager and a monitoring service provided in it. The requested new connection between the set-top box 10 and the stereo amplifier 40 is then entered. The process of entering the connection is illustrated in FIG. 10.

Figure 11:
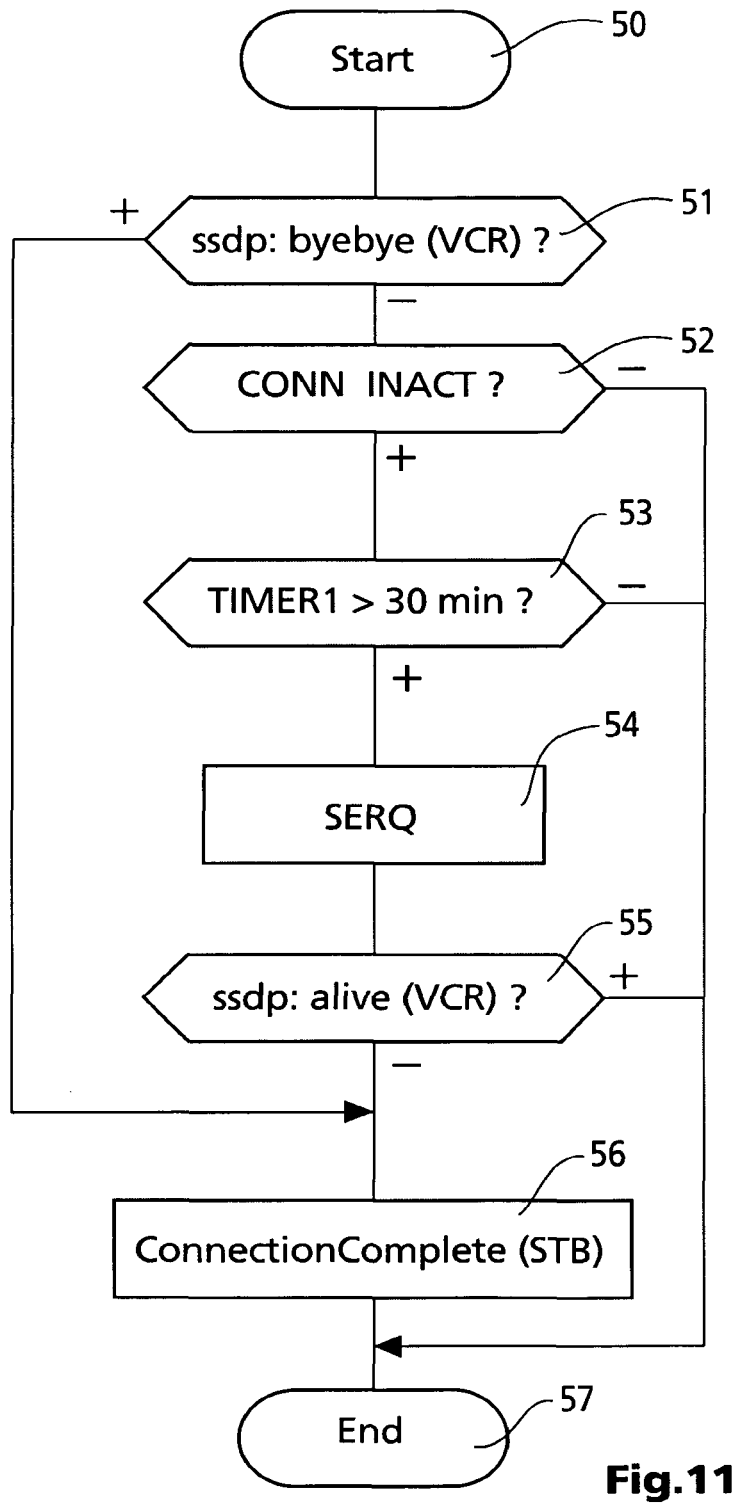
FIG. 11 shows a first example for a program for monitoring an AV connection and FIG. 12 shows a second example for a program for monitoring an AV connection.

FIG. 11 shows a structogram for a monitoring program which is additionally located in the connection manager in the set-top box 10. This program is processed continuously while a connection to the set-top box is set up. The reference number 50 denotes the start of the program. The reference number 51 denotes a program step in which a program is carried out to determine whether the logging-off message ssdp:byebye has been received by the connection partner. If the logging-off message has been received, the program then jumps to the program step 56, in which the connection complete (STB) action is called, by means of which the entered connection for the set-top box 10 is once again removed from the memory. If the logging-off message had not yet been received, the program step 52 would first of all check whether the connection that had been set up was currently inactive. This is the situation, for example, when the video recorder 20 is switched to the stop mode when there is a connection between the set-top box 10 and the video recorder 20. For the situation where the connection is still active, the program is ended directly by the program step 56. Otherwise, when an inactive AV connection is present, the timer is checked in the program step 53. This timer is started on each occasion after the fact that an AV connection has become inactive is first identified, and then continues to run until the connection becomes active or until a specific limit value is exceeded. In the illustrated situation, the limit value is set to 30 minutes. When this count is exceeded, then a signaling request is sent to all the network stations in the next program step 54. The search request message is provided for this purpose in the UPnP Standard. All the nodes that are still active in the network respond to this request with a confirmation message ssdp:alife. The identification number of the responding device is then also in each case entered in this confirmation message. In the UPnP-Standard, this is known by the abbreviation QUID for Universally Unit Identifier. The program now checks in the next program step 55 whether the ssdp:alife (VCR) message has been received by the connected video recorder. If this is the case, then the program jumps to the program step 56, by means of which the program is ended. The connection is then therefore not ended. Otherwise, it is assumed that the connected device has been disconnected from the network without any logging-off message having been sent. The connection complete (STB) action is then called in the next program step 56, by means of which the connection entered in the memory for the set-top box 10 is deleted. The program is then ended in the program step 57.

Figure 12:
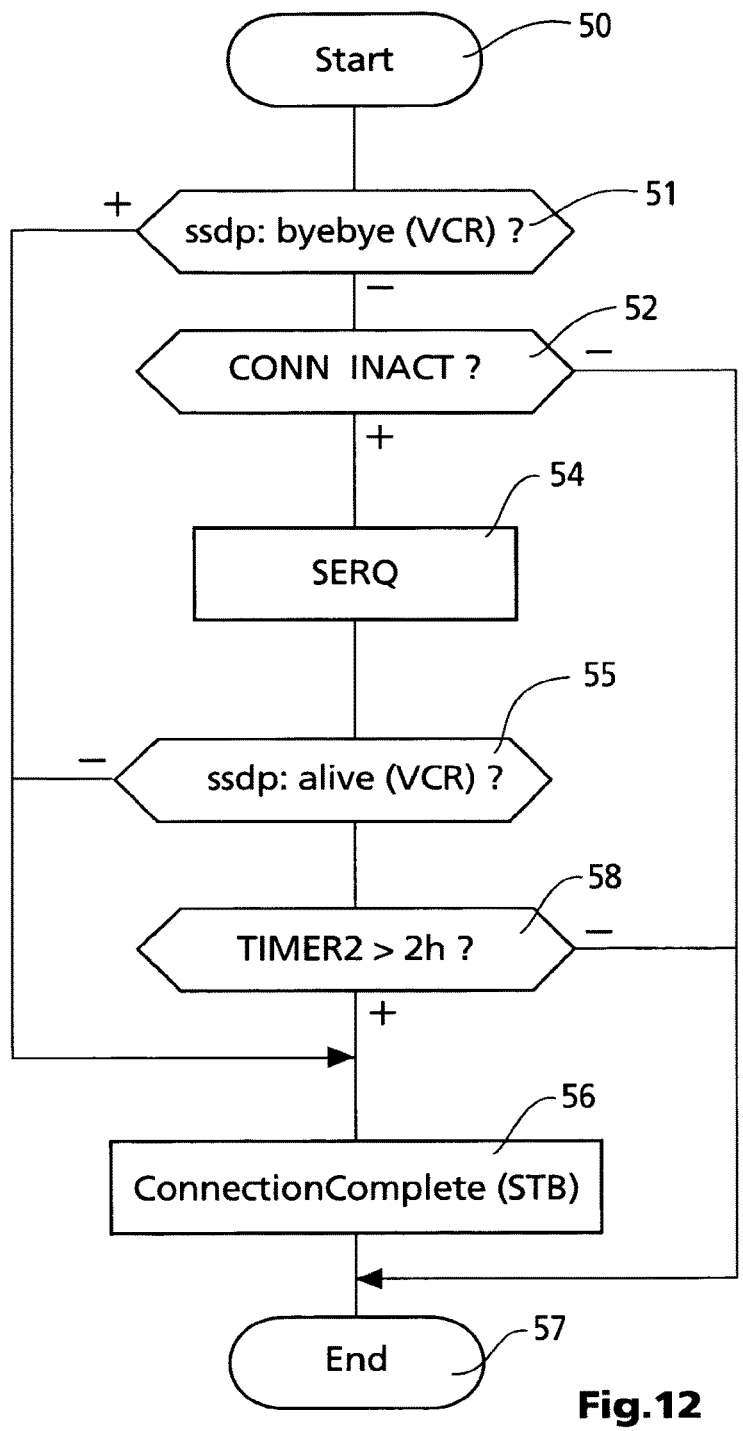

FIG. 12 also shows a structogram for a program which is processed in the connection manager of the set-top box when a new connection request is received at the set-top box while an old connection is still set up in the memory. FIG. 12 uses the same reference numbers for the same program steps as in FIG. 11. To this extent, the program does not need to be explained in any more detail once again. One difference is that, after checking in the program step 52 whether the connection that has been set up has become inactive, the signaling request is sent directly to all the network subscriber stations. Thus, in this case, the count of the timer 1 is not checked first of all. However, if it has been found in the subsequent program step 55 that the connection partner, in the case of the example of video recorder 20, is still registered in the network, the program is not ended straightaway, but a check 58 is then carried out, in which the count of a second timer 2 is checked. The timer 2 is likewise started when it has been found for the first time that the connection which has been set up has become inactive. A check is then carried out at 58 to determine whether the connection that has been set up has been inactive for more than two hours. If this is not the case, the program is ended in the program step 57. However, if this time period has passed, then the connection which has been set up is removed from the memory once again in the program step 56. The newly requested connection can then be set up.

The invention can be used in a worthwhile manner in particular for devices which are designed in accordance with the UPnP Standard. The invention provides advantages for UpnP-based domestic networks in particular when setting up AV connections which are frequently set up over lengthy time periods. AV connections such as these could, however, also for example be telephone, fax and Internet connections, which likewise also remain in existence over lengthy time periods.

The invention claimed is:

1. A method for monitoring audio/video (AV) connections by a first device of a home wired or wireless network, said network comprising a plurality of stations including, further to the first device, at least a control device for initiating, controlling and removing an AV connection from said AV connections and at least one second device, the first device and the at least one second device being controlled media devices, wherein an AV connection between the first device and the at least one second device is set up by said control device, said method comprising: monitoring by the first device said AV connection to determine whether the at least one second device when connected to the first device has sent a logging-off message; and
   when said logging-off message is detected, automatically invoking by said first device a connection complete action ending said connection with said at least one second device.

2. The method as claimed in claim 1, wherein when said first device is AV connected to said at least one second device, the method comprises:
   sending by said first device a signaling request to the stations in the network when the AV connection has remained unused for a first specific time, and
   when the signaling request remains unanswered by the at least one second device which is AV connected to the first device, ending by the first device the setting up of the AV connection by invoking a connection complete action in the first device on its own.

3. The method as claimed in claim 1, wherein when a new connection request arrives, the first device from which an AV connection to another station has already been set up, sends a signaling request to the stations in the network and in the situation where the signaling request remains unanswered by the other station which is AV connected to the first device, the first device ends the setting up of the AV connection by automatically invoking a connection complete action in the first device.

4. The method as claimed in claim 1, wherein at least one of audio and video data is transmitted via the AV connection.

5. The method as claimed in claim 1, wherein the data transmissions in the network are compatible with the UPnP standard.

6. The method of claim 1, wherein said first device is a media server.

7. The method of claim 1, wherein said first device is a media renderer.

8. A method for monitoring audio/video (AV) connections by a first device of a home wired or wireless network, said network comprising a plurality of stations including, further to the first device, at least a control device for initiating, controlling and removing an AV connection from said AV connections and at least one second device, the first device and the at least one second device being controlled media devices, wherein an AV connection between the first device and the at least one second device is set up by said control device, said method comprising: monitoring by the first device said AV connection to determine whether the at least one second device when connected to the first device has sent a logging-off message; and
when said logging-off message is detected, automatically invoking by said first device a connection complete action ending said connection with said at least one second device; wherein
when a new connection request arrives, the first device from which an AV connection to another station has already been set up, sends a signaling request to the stations in the network and in the situation where the signaling request remains unanswered by the other station which is AV connected to the first device, the first device ends the setting up of the AV connection by automatically invoking a connection complete action in the first device; and
in the situation in which the other station on the AV connection which has been set up is still registered in the network, the AV connection has remained unused for a second specific time, the first device which is carrying out the monitoring ends the setting up of the existing AV connection by automatically invoking a connection complete action.

9. A first device to monitor audio/video (AV) connections which have been set up between stations in a home wired or wireless network, said stations of the network comprising, further to the first device, at least a control device for initiating, controlling and removing an AV connection from said AV connections and at least one second device, the first device and the at least one second device being controlled media devices, wherein an AV connection between the first device and the at least one second device is set up by said at least one control device, said first device being configured to:
monitor said AV connection to determine whether the at least one second device when connected to the first device has sent a logging-off message; and
when said logging-off message is detected, invokes a connection complete action ending said connection with said at least one second device.

10. The first device as claimed in claim 9, wherein when said first device is AV connected to said at least one second device, said first device is configured to:
send a signaling request to the stations in the network when the AV connection has remained unused for a first specific time, and
when the signaling request remains unanswered by the at least one second device which is AV connected to the first device, ends the setting up of the AV connection by invoking a connection complete action in the first device on its own.

11. The first device as claimed in claim 10, wherein when a new connection request arrives, said first device, from which an AV connection to another station has already been set up, is configured to:
send a signaling request to the stations in the network, and
in the situation where the signaling request remains unanswered by the other station which is AV connected to the first device, ends the setting up of the AV connection by automatically invoking a connection complete action in the first device.

12. The first device as claimed in claim 9, wherein at least one of audio and video data is transmitted via the AV connection.

13. The first device as claimed in claim 9, wherein the data transmissions in the network are compatible with the UPnP standard.

14. The first device of claim 9, wherein said first device is a media server.

15. The first device of claim 9, wherein said first device is a media renderer.

16. A first device to monitor audio/video (AV) connections which have been set up between stations in a home wired or wireless network, said stations of the network comprising, further to the first device, at least a control device for initiating, controlling and removing an AV connection from said AV connections and at least one second device, the first device and the at least one second device being controlled media devices, wherein an AV connection between the first device and the at least one second device is set up by said at least one control device, said first device being configured to:
monitor said AV connection to determine whether the at least one second device when connected to the first device has sent a logging-off message; and
when said logging-off message is detected, invokes a connection complete action ending said connection with said at least one second device; wherein
in the situation in which the other station on the AV connection which has been set up is still registered in the network, the AV connection has remained unused for a second specific time, the first device, which is carrying out the monitoring, is configured to end the setting up of the existing AV connection by automatically invoking a connection complete action.

17. A first device to monitor audio/video (AV) connections which have been set up between stations in a domestic network, the stations of the network comprising in addition to and different from the first device, a control device and a second device, wherein the first device and the second device being controlled media devices and the control device being a dedicated control point initializing and configuring the first device and the second device to set up an AV connection between the first device and the second device for the transmission of AV data between the first device and the second device, wherein:
- the first device including a connection manager module monitoring the AV connection set up by the control device to determine whether the second device connected in the AV connection with the first device has sent a logging-off message; and
- when said logging-off message is detected, said connection manager module of said first device invoking a connection complete action ending said AV connection with said second device.

18. The first device of claim 17, wherein the data transmissions in the network are compatible with the UPnP standard.

19. The first device of claim 18, wherein the first device comprises a media server.

20. The first device of claim 18, wherein the first device comprises a media renderer.

* * * * *